US012776811B2

(12) United States Patent
Singh et al.

(10) Patent No.: US 12,776,811 B2
(45) Date of Patent: Oct. 27, 2026

(54) PATH-LOSS MODEL FOR SIZE AND PLACEMENT OF ENGINEERED METASURFACES

(71) Applicant: Dell Products L.P., Round Rock, TX (US)

(72) Inventors: Tejinder Singh, Manotick (CA); Kan Wang, Ottawa (CA); Navjot Kaur Khaira, Manotick (CA)

(73) Assignee: Dell Products L.P., Round Rock, TX (US)

( * ) Notice: Subject to any disclaimer, the term of this patent is extended or adjusted under 35 U.S.C. 154(b) by 258 days.

(21) Appl. No.: 18/653,440

(22) Filed: May 2, 2024

(65) Prior Publication Data

US 2025/0343573 A1 Nov. 6, 2025

(51) Int. Cl.

*H04B 7/04* (2017.01)
*H04B 17/318* (2015.01)
*H04W 16/18* (2009.01)

(52) U.S. Cl.

CPC ....... *H04B 7/04013* (2023.05); *H04B 17/318* (2015.01); *H04W 16/18* (2013.01)

(58) Field of Classification Search

CPC .. H04B 7/04013; H04B 17/318; H04W 16/18

(Continued)

(56) References Cited

U.S. PATENT DOCUMENTS 10,069,535 B2 * 9/2018 Vannucci .................. H01P 3/10
10,148,016 B2 * 12/2018 Johnson ............... H01Q 21/067

(Continued)

FOREIGN PATENT DOCUMENTS

WO WO-2024178210 A2 * 8/2024 ........... G01S 13/931

OTHER PUBLICATIONS

Quevedo-Teruel O, Chen H, Díaz-Rubio A, Gok G, Grbic A, Minatti G, Martini E, Maci S, Eleftheriades GV, Chen M, Zheludev NI., "Roadmap on metasurfaces," Journal of Optics, vol. 21, No. 7, 45 pages, Jul. 2019.

(Continued)

*Primary Examiner* — Mahendra R Patel

(74) *Attorney, Agent, or Firm* — Amin, Turocy & Watson, LLP

(57) ABSTRACT

The technology described herein is directed towards designing and configuring a reconfigurable intelligent surface for deployment, based on a straightforward path-loss model having simplified input variables available to a designer, and having mitigated characterization complexity when compared to other path loss models. The relatively large distance that exists between the feed antenna and a reconfigurable intelligent surface facilitates approximation of certain factors, resulting in a practical solution for design and deployment of a reconfigurable intelligent surface of interest. The input variables include the geometry of the reconfigurable intelligent surface, receiver gain, transmitter gain, and the directivity of the transmitting antenna, which are parameters that are easily available to a designer for deploying a reconfigurable intelligent surface. A reconfigurable intelligent surface deployment position and/or size can be determined via an iterative optimization approach, to optimize the position and/or size based on a defined optimization cost expression.

14 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,530,505 | B2 * | 1/2020 | Henry | H04B 17/3911 |
| 2023/0300006 | A1 * | 9/2023 | Abdallah et al. | H04L 25/022 375/267 |
| 2023/0308200 | A1 * | 9/2023 | Dai | H04B 17/3913 |
| 2024/0098516 | A1 * | 3/2024 | Yildiz | H04W 16/20 |
| 2024/0297684 | A1 * | 9/2024 | Tian | H04B 7/04013 |
| 2026/0066951 | A1 * | 3/2026 | Huang et al. | H04B 7/04013 |

OTHER PUBLICATIONS

S. Basharat, S. A. Hassan, H. Pervaiz, A. Mahmood, Z. Ding and M. Gidlund, “Reconfigurable Intelligent Surfaces: Potentials, Applications, and Challenges for 6G Wireless Networks,” in IEEE Wireless Commun., vol. 28, No. 6, pp. 184-191, Dec. 2021, doi: 10.1109/MWC.011.2100016.

R. Chen, M. Liu, Y. Hui, N. Cheng, and J. Li, “Reconfigurable Intelligent Surfaces for 6G IoT Wireless Positioning: A Contemporary Survey,” IEEE Internet of Things J., vol. 9, No. 23, 13 pages, 2023, doi: 10.1109/JIOT.2022.3203890.

P. Nayeri, F. Yang, and A. Z. Elsherbeni, “Reflectarray Antennas: Theory, Designs and Applications”. Hoboken: Wiley-IEEE Press, 2018. 413 pages.

J. Huang and J. A. Encinar, “Reflectarray Antennas”. Hoboken N.J.: Wiley-Interscience, 2008. 225 pages.

M. Zebrowski, “Illumination and spillover efficiency calculations for rectangular reflectarray antennas”, [https://highfrequencyelectronics.com/Dec12/1212_HFE_reflectarray.pdf] (accessed Aug. 28, 2023). 7 pages.

P. Kline, “Understanding RSSI, RSRP, and RSRQ—welcome to the 5gstore blog welcome to the 5gstore blog—lastest news, product info & more,” Apr. 8, 2021, Welcome to the 5Gstore Blog, [https://5gstore.com/blog/2021/04/08/understanding-rssi-rsrp-and-rsrq/] (accessed Mar. 5, 2024). 5 pages.

J. Jeong, J. H. Oh, S. Y. Lee, Y. Park, and S.-H. Wi, “An Improved Path-Loss Model for Reconfigurable-Intelligent-Surface-Aided Wireless Communications and Experimental Validation,” in IEEE Access, vol. 10, pp. 98065-98078, 2022, doi: 10.1109/ACCESS.2022.3205117.

Basar, M. Di Renzo, J. De Rosny, M. Debbah, M.-S. Alouini and R. Zhang, “Wireless Communications Through Reconfigurable Intelligent Surfaces,” in IEEE Access, vol. 7, 21 pages, 2019, doi: 10.1109/ACCESS.2019.2935192.

A-A. A. Boulogeorgos and A. Alexiou, “Pathloss modeling of reconfigurable intelligent surface assisted THz wireless systems,” ICC 2021—IEEE International Conference on Communications, Montreal, QC, Canada, 2021, pp. 1-6, doi: 10.1109/ICC42927.2021.9500473.

M. Di Renzo et al., “Reconfigurable Intelligent Surfaces vs. Relaying: Differences, Similarities, and Performance Comparison,” in IEEE Open Journal of the Communications Society, vol. 1, 9 pages, 2020, doi: 10.1109/OJCOMS.2020.3002955.

Q. Wu and R. Zhang, “Towards Smart and Reconfigurable Environment: Intelligent Reflecting Surface Aided Wireless Network,” in IEEE Communications Magazine, vol. 58, No. 1, 7 pages, 2019, doi: 10.1109/MCOM.001.1900107.

P. Kline, “Understanding RSSI, RSRP, and RSRQ—welcome to the 5gstore blog welcome to the 5gstore blog—lastest news, product info & more,” Welcome to the 5Gstore Blog, Apr. 8, 2021, [https://5gstore.com/blog/2021/04/08/understanding-rssi-rsrp-and-rsrq/] (accessed Mar. 5, 2024) 5 pages.

* cited by examiner

PATH-LOSS MODEL FOR SIZE AND PLACEMENT OF ENGINEERED METASURFACES

BACKGROUND

Reconfigurable intelligent surfaces, sometimes referred to as metasurfaces, are made from an array of engineered elements, often sub-wavelength in size, arranged on a planar surface. These elements can be phase-shifting units or resonators that modify the phase, amplitude, and polarization of incident electromagnetic waves to redirect (e.g., reflect or refract) incoming electromagnetic beams in a fixed direction, and/or split a reflected beam into multiple directions, by modifying the resultant beams in terms of phase and amplitude. As such, reconfigurable surfaces are being investigated for use in the millimeter wave (mmWave) spectrum, where reflected beams can avoid obstacles that otherwise block a signal between a transmitter (e.g., a base station) and a receiver (e.g., a user equipment).

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
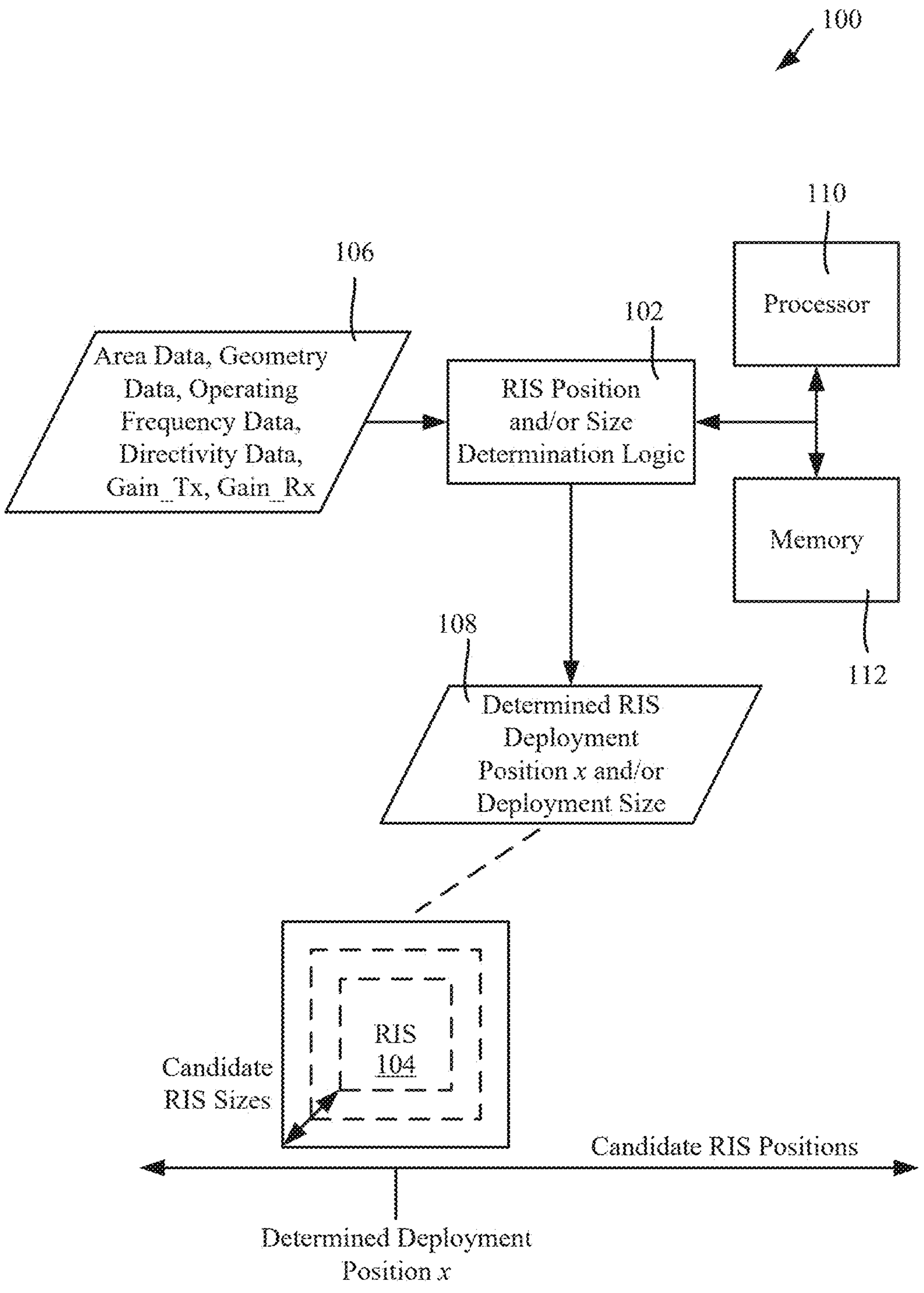
FIG. 1 is a block diagram showing an example system for determining positioning and/or size of a reconfigurable intelligent surface (RIS, also referred to as a metasurface) based on a path loss model as described herein, in accordance with various embodiments and implementations of the subject disclosure.

Various embodiments and implementations of the technology described herein are generally directed towards designing and implementing a reconfigurable intelligent surface (metasurface) based on a path-loss model for reconfigurable intelligent surface (RIS) placement and/or size, using far less design variables (e.g., three) compared to more than twelve complex variables as currently used in a standard path loss model. As described herein, path loss estimation, that is, the estimated attenuation of signal strength through the dynamic environment of RIS-equipped networks, can be used in a design process flow for more optimal reconfigurable intelligent surface size and placement.

The path loss model described herein is based, in part, on a large distance approximation on aperture efficiency analysis for reflector antennas, using the characteristic of a reconfigurable intelligent surface scenario in which a relatively large distance exists between the feed antenna and the surface of interest. The resulting expression of this model avoids the need for intricate empirical parameters, such as spectrum reflection loss/gain and unit-cell pattern, which can be difficult to accurately characterize. Instead, the path loss model described herein relies on the directivity of the feed antenna and other geometric parameters, offering a more accessible and practical path-loss modeling solution.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and reconfigurable intelligent surfaces in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" position can mean selecting a position from a finite set of incremental positions, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 shows a generalized block diagram of an example system 100 including RIS position and/or size determination logic 102 for deploying a reconfigurable intelligent surface 104 (RIS, a reflective or refractive metasurface) of elements, also referred to herein as unit cells. As described herein, given input data 106 such as geometry, gain data, RIS area data, operating frequency of the RIS, directivity of the feed antenna and other data described herein, path loss can be determined at various candidate positions and/or for various sizes (aperture areas) of the RIS 104, with one of the positions selected as the deployment position and/or one of the sizes selected as the deployment size (block 108) of the RIS 104.

To this end, in one example implementation the position and/or size determination logic 102, coupled to at least one processor 110 and memory 112, iteratively performs calculations, including path loss calculations using the path loss model as described herein, over various candidate positions and/or candidate sizes, to evaluate respective path losses and corresponding respective desired gain values until a stopping criterion is met. The stopping criterion can be satisfying a threshold gain value, or some other stopping criterion, such as stopping when the full set of available candidate reconfigurable intelligent surface positions and/or sizes has been iterated over, e.g., with the candidate reconfigurable intelligent surface position with the highest resultant highest gain selected thereafter.

Described herein with reference to FIGS. 2-5 is a technology including a procedure for designing and configuring a reconfigurable intelligent surface for usage, including by deriving a reconfigurable intelligent surface gain expression using a large distance approximation based on aperture efficiency analysis in reflector antennas. In one example implementation, a mathematical derivation of a simplified path loss model is based on the Friis equation (1):

$$\begin{aligned} PathLoss(\mathrm{dB}) &= P_t - P_r \\ &= \mathrm{Gain}_{surf} + FSPL + \mathrm{Gain}_{Rx} \end{aligned} \quad (1)$$

where $\mathrm{Gain}_{surf}$, FSPL and $\mathrm{Gain}_{Rx}$ correspond to the gain of the surface combined with a feed antenna, free space path loss and the gain of the receiving antenna, respectively.

It will be shown herein that the combination of surface with the feed antenna is advantageous for computation and validation purposes. The free space path loss can be calculated for a given transmitting distance and reconfigurable intelligent surface operating frequency; the gain of the receiving antenna is usually known. Described herein is estimating the gain of the reconfigurable intelligent surface with feed antenna, without excessive numerical experiments.

Figure 2:
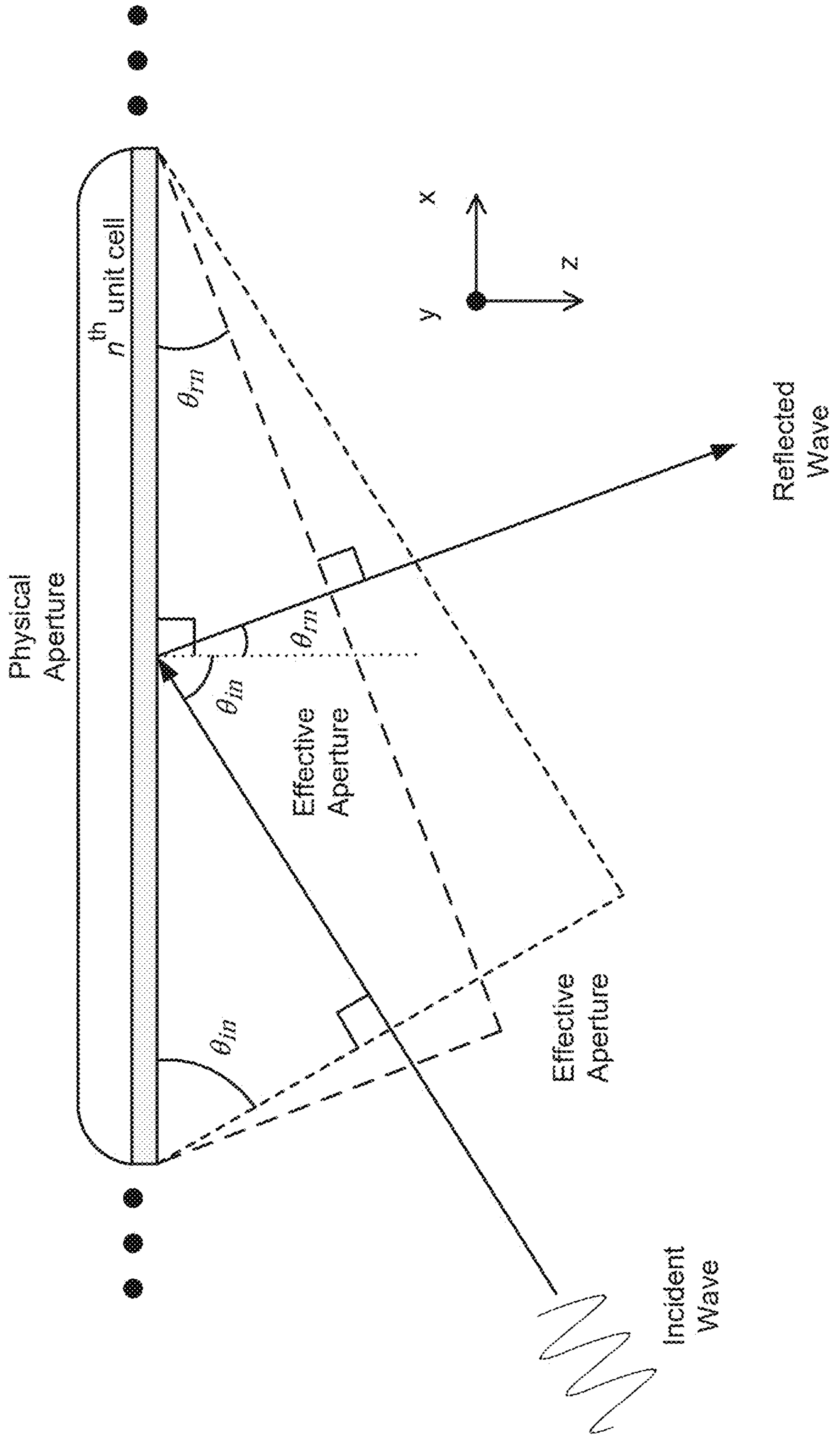
FIG. 2 is an example representation of effective aperture area relative to the physical aperture area of a reconfigurable intelligent surface for use in path loss determination, in accordance with various embodiments and implementations of the subject disclosure.

With reference to FIG. 2, in aperture-type antennas such as reflectarrays or reconfigurable intelligent surfaces, the gain can be computed from the physical aperture area A:

$$\mathrm{Gain}_{surf} = 4\pi\frac{A}{\lambda^2}\eta \quad (2)$$

where λ is the wavelength of the RIS's operating frequency and η is the overall aperture efficiency. While many efficiency factors influence the aperture efficiency, the major factors are spillover and illumination efficiencies, similar to reflector antennas. It will be shown herein that for reconfigurable intelligent surface scenarios, the spillover efficiency is the dominant factor. The product of these two efficiencies results in the aperture efficiency for gain calculation:

$$\eta = \eta_s. \quad (3)$$

Hence in order to calculate gain of the reconfigurable intelligent surface given a feed antenna, three terms are to be evaluated A, $\eta_s$, $\eta_i$ as described below.

Instead of the physical aperture area, the effective aperture area from antenna theory is used as shown in FIG. 2, which depicts an engineered metasurface, along with an incident wave, reflected wave and effective aperture. More particularly, the effective aperture area of the RIS can be determined by projecting the physical surface area onto the planes normal to the incident and reflected wave direction. The idea of effective aperture area for unit-cell has been evaluated, however, described herein is extending the concept to the entire reconfigurable intelligent surface, which removes the numerical summation of contribution on each unit-cell orientation and its gain pattern. This extension is based on the transmission (Tx) source being located at a relatively large distance from the surface, which is appropriate for reconfigurable intelligent surface scenarios, $d_{tx} >> d_s$. This is not true for most reflector antenna designs, because in such designs, the feed locates at a much closer proximity, whereby the incidence angle to each unit cell $\theta_{in}$ cannot be assumed to be uniform; thus, for reflector antenna designs, a numerical method is to be applied to account the variation of the angle for each unit-cell.

However, based on the large distance approximation, the following relationship exists:

$$A_{eff} = A\cos\theta_{in}\cos\theta_{rn} \tag{4}$$

where A is the physical aperture area of the RIS, and $\theta_{in}$, $\theta_{rn}$ are the incident and reflected angle of the RIS, respectively.

Another factor, the spillover efficiency, $\eta_s$, is defined as the ratio of the radiated power from the feed that is intercepted by the reflecting aperture to the total radiated power. The mathematical expression for this is set forth in equation (5):

$$\eta_s = \frac{\int\int_A \vec{P}(\vec{r_f}) \cdot d\vec{s}}{\int\int_{Sphere} \vec{P}(\vec{r_f}) \cdot d\vec{s}} \tag{5}$$

where the power from the feed is evaluated across an aperture area A for the numerator, and an entire sphere for the denominator, by integrating the fluxes of the Poynting vector $\vec{P}(\vec{r_f})$. The Poynting vector of the feed can be approximated using the $\cos^q$ pattern model (balanced feed model, where the feed antenna directivity is captured by q):

$$\vec{P}(\vec{r_f}) = \hat{r_f}\frac{\cos^{2q}\theta_f}{r_f^2}. \tag{6}$$

The spillover efficiency for engineered metasurfaces or reflectarrays is typically computed numerically, because the numerator in equation (5) is dependent on the feed position and aperture shape. By using a circular aperture, closed-form expression of the spillover efficiency can be evaluated using integration by parts:

$$\eta_s = \frac{\int_0^{\phi=} \vec{P}(\vec{r_f}) \cdot d\vec{s}}{\int\int_{Sphere} \vec{P}(\vec{r_f}) \cdot d\vec{s}} \tag{7}$$

$$\eta_s = -\cos^{2q+1}\theta_s + 1 \tag{8}$$

$$\theta_s = \arctan\frac{d_s}{2r_f}. \tag{9}$$

It should be emphasized that the expression for spillover efficiency is only dependent on the feed antenna directivity, captured by q, and the geometry of the reconfigurable intelligent surface deployment, captured by the feed-to-RIS distance $r_f$ and the RIS size $d_s$. Although the aperture shape is assumed to be circular to arrive at a closed form expression, a square reconfigurable intelligent surface can also use the same expression for estimation with only a small percent error on calculated efficiency.

The illumination efficiency, $\eta_i$, is another factor, is mathematically given as:

$$\eta_i = \frac{1}{A_a}\frac{\left|\int\int_A I(A')dA'\right|^2}{\int\int_A |I(A')|^2 dA'} \tag{10}$$

where I is the amplitude distribution over the reflector aperture excited by the feed.

This expression is also generally evaluated at each element on the aperture using numerical techniques:

$$I_n(A) = \frac{\cos^q\theta_f}{r_f}\cos^{q_e}\theta_p. \tag{11}$$

However, with a large distance as approximated for reconfigurable intelligent surface scenarios, the angle $\theta_p$, $\theta_f$ is close to zero. After applying the 0-th order Taylor expansion of the cosine function, which assumes a constant value of amplitude distribution across the reconfigurable intelligent surface aperture, the spillover efficiency can be approximated:

$$\eta_i(r_f \gg d_s) \approx \frac{1}{A}\frac{|AI|^2}{A|I|^2} = 1 \tag{12}$$

which means the illumination efficiency is approximately 100% with a large distance between the feed and the surface, with respect to the surface size. This also can be shown in many examples using numerical analysis with a $\eta_i \geq 95\%$ with $25\lambda$ separation between input feed and reflectarray. Although it is not desirable in most reflectarray designs, in reconfigurable intelligent surface scenarios the distance is generally much greater than $25\lambda$.

The reconfigurable intelligent surface gain model described herein, based on a large distance approximation aperture efficiency analysis, is:

$$\text{Gain}_{surf} = 4\pi\frac{A_{eff}}{\lambda^2}\eta_s\eta_i \tag{13}$$

-continued $$A_{eff} = A\cos\theta_{in}\cos\theta_{rn} \tag{14}$$

$$\eta_s = -\cos^{2q+1}\theta_s + 1 \tag{15}$$

$$\theta_s = \arctan\frac{d_s}{2r_f} \tag{16}$$

$$\eta_i \approx 1 \tag{17}$$

which uses only the geometry of the reconfigurable intelligent surface deployment and the directivity of the transmitting antenna, parameters that are easily available to a designer.

The model can be directly compared to the gain from numerical method, for example full-wave simulation with around a 2-3 dB error due to the simplification of the model, which will be described herein. A more accurate reconfigurable intelligent surface gain model can include the unit-cell radiation pattern and the average loss of the cell:

$$\text{Gain}_{surf}(\text{dB}) = 10\log\left(4\pi\frac{A_{eff}}{\lambda^2}\eta_s\eta_i\cos^{q_u}\theta_{rn}\right) - L_u \tag{18}$$

where the unit-cell loss $L_u$ varies based on the synthesized phase pattern on aperture, and the unit-cell radiation pattern $q_u$ in a $\cos^q$ model; (these are not easily available parameters). Other effects such as ground exposure, phase error can also be added, but these may not be easily accessible (if accessible at all) to the designer.

Either of these surface gain models can be substituted into equation (1) to estimate the expected path loss. Full-wave simulation and other more sophisticated path-loss models can also be used to calculate reconfigurable intelligent surface gain, $\text{Gain}_{surf}$, more accurately at the expense of a much greater time consumption.

Figure 3:
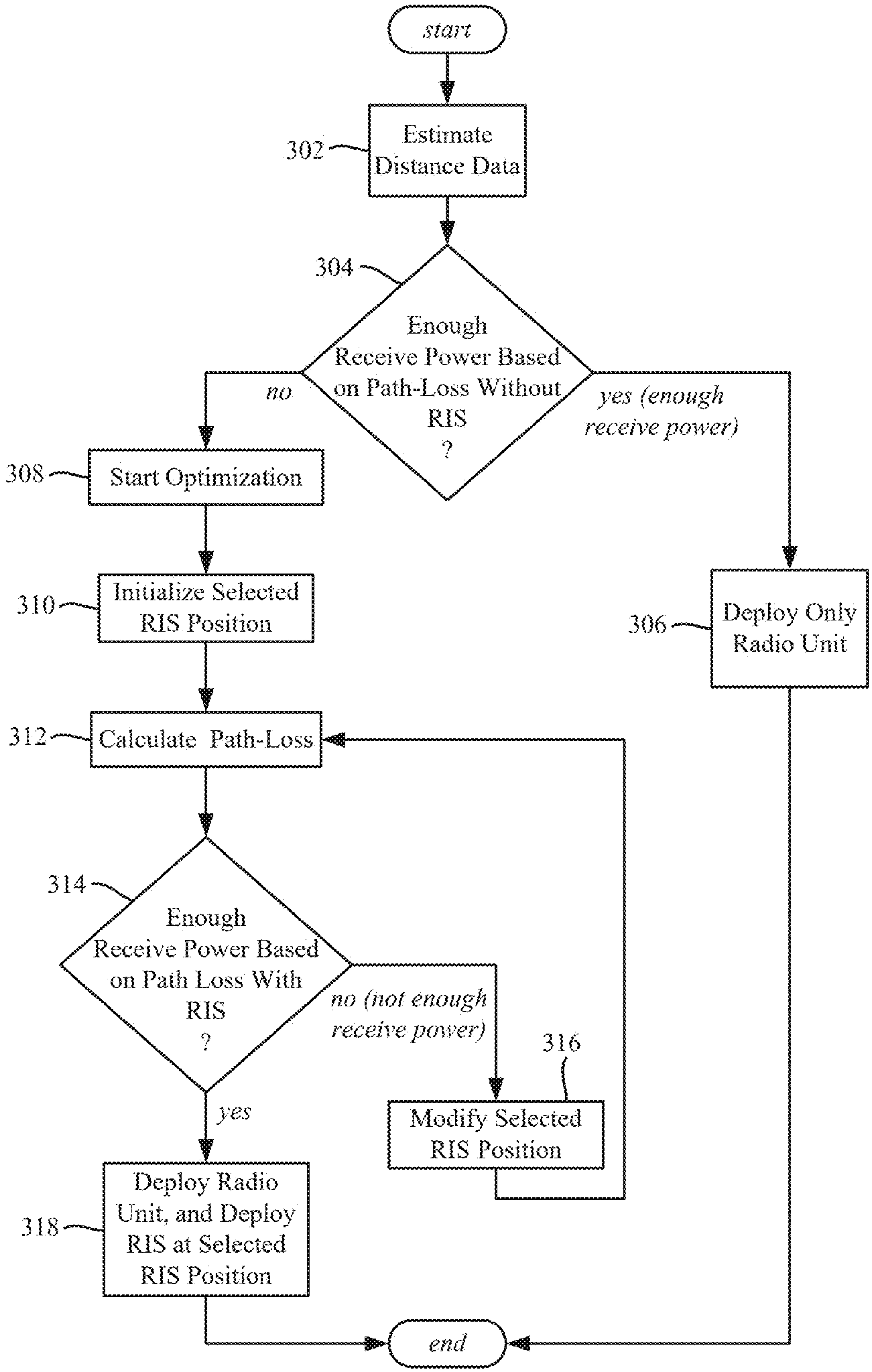
FIG. 3 is a flow diagram representing example operations related to reconfigurable intelligent surface size design and placement (deployment position) based on utilizing path-loss estimation, in accordance with various embodiments and implementations of the subject disclosure.

Turning to determining the position of the reconfigurable intelligent surface based on the above, FIG. 3 shows an iterative optimization procedure which represents an iterative procedure of reducing a cost expression to a defined received power target. In general, using the derivation, an optimization cost can be evaluated based on the desired power level on the receiver (client) side. Based on definition of the path-loss, the relationship between the transmitted power and the received power is:

$$P_{tx} + PL = P_{rx} \tag{19}$$

where received power is generally defined with a minimum acceptable value to represent signal quality. As one example, received signal strength indicator (RSSI) can be used to represent the signal quality in a 3G signal, where −70 dBm is considered excellent, while −110 dBm is poor or no signal. As another example, in LTE, reference signal received power (RSRP) is the signal quality equivalent in an LTE signal, where-95 dBm is considered a strong signal, whereas-115 dBm is considered very weak.

Because reference signal received power is given in one protocol as a requirement, in one implementation the received power level can be used as the goal for optimization. The above expression can be rewritten to an optimization cost using the path-loss model described herein:

$$\text{Cost} = P_{rx,goal} - P_{t,x-} - PL \tag{20}$$

$$PL = \text{Gain}_{surf} + FSPL + \text{Gain}_{Rx} \tag{21}$$

$$\text{Gain}_{surf} = 4\pi\frac{A_{eff}}{\lambda^2}\eta_s\eta_i \tag{22}$$

where this cost can be evaluated iteratively to obtain the optimum placement and/or size of the reconfigurable intelligent surface using the described path-loss model.

Figure 4:
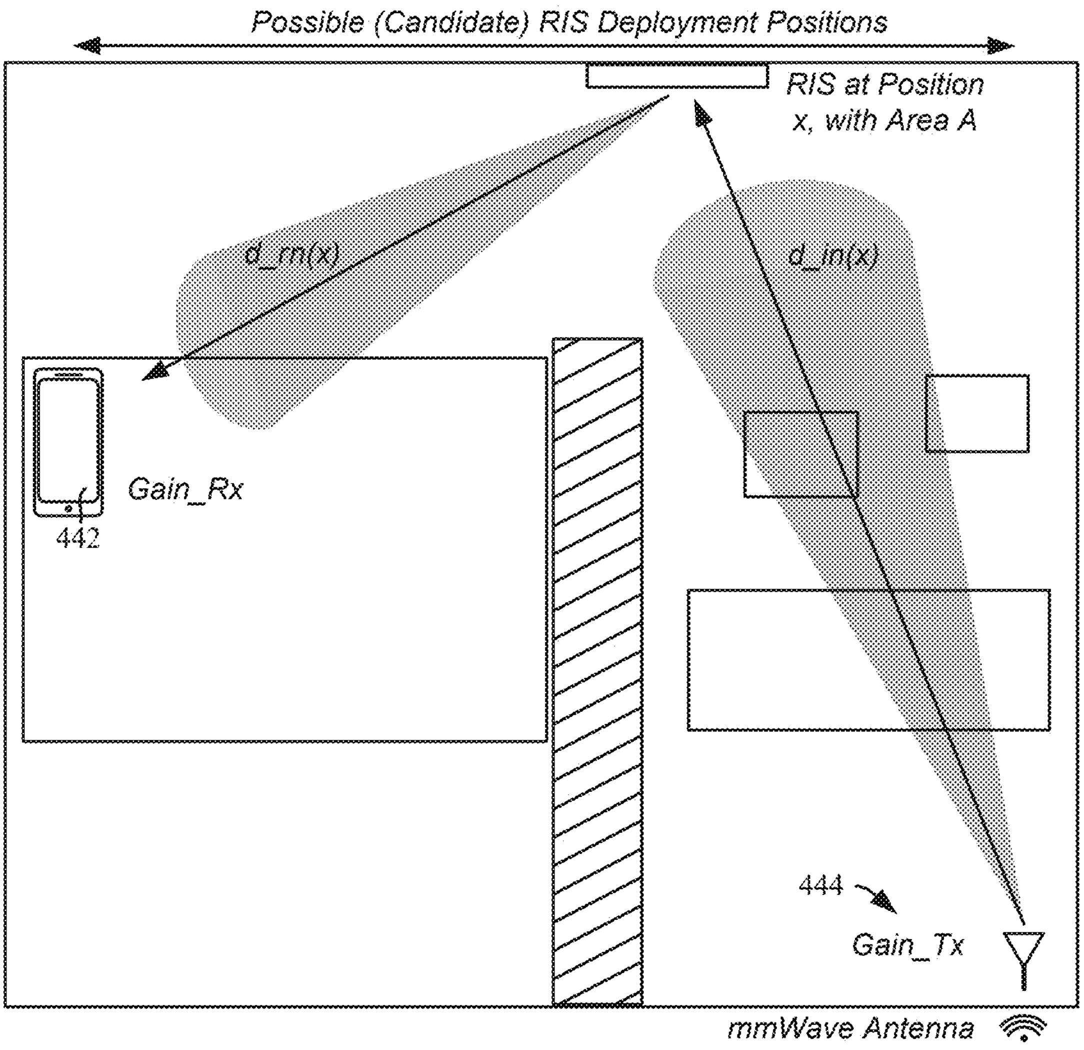
FIG. 4 is a representation of example candidate positions for locating a reconfigurable intelligent surface based on path loss values determined from gain data and effective RIS aperture area, and geometric relationship data between a transmitter, receiver and the reconfigurable intelligent surface, in accordance with various embodiments and implementations of the subject disclosure.

FIG. 4 depicts an example office scenario of a mmWave antenna with an assisting RIS 404. For example, consider that to reach the position of the receiver 442, the signal from the feed transmitter 444 can go over the rectangular shapes (e.g., desks, unshaded, and a short divider represented by the rectangle shape shaded with diagonal lines). Consider further that the RIS 404, if requested or needed in a given scenario, is to be deployed somewhere along the possible (candidate) RIS deployment positions. The four parameters used to evaluate this cost (RIS position x, area A (which can be a variable), transmitting gain $\text{Gain}_{Tx}$, also represented as Gain_TX, and receiving gain $\text{Gain}_{Rx}$, also represented as Gain_Rx) are included in the following office scenario as an example; this highlights the simplicity of the technology described herein, in contrast to existing methods.

Returning to the iterative RIS placement procedure of FIG. 3, operation 302 represents estimating the various distance data, e.g., based on the transmitter and receiver locations. Operation 304 evaluates whether there is sufficient receive power, based on a distance-based path loss determination, without needing to deploy a RIS. If so, no RIS is needed, and the process ends after deploying only the corresponding radio unit (operation 306). It is also possible that an RIS may need to be deployed to get around an obstacle, such as a tall wall between the transmitter and receiver (e.g., in the office scenario of FIG. 4).

If there is insufficient receive power without the RIS, operation 304 instead branches to operation 308 to begin the cost optimization (equation (20), based on equations (21) and (22)) until a stopping criterion is met, which in this example implementation is a desired (the $P_{rx,goal}$) threshold receive power level being satisfied. Operation 310 initializes a selected RIS candidate position, e.g., as far right along the horizontal axis as possible; note that vertical positioning is not considered in this example, however vertical axis candidate iterations can also be performed in conjunction with horizontal axis candidate iterations in a relatively straightforward manner.

Operation 312 represents calculating the path loss at the currently selected candidate position, which corresponds to the cost determination/amount of receive gain using the equations (20)-(22). If there is not enough receive power (with the RIS if deployed at the currently selected position) as evaluated at operation 314, operation 316 modifies the selected RIS position, e.g., selects a different candidate position some incremental amount (e.g., one inch to the left of the previous candidate position, although it may be possible to use a binary search to hone in on the final deployment position more quickly), and the iterations continue. If there is enough receive power (with the RIS if deployed at the currently selected position) as evaluated at operation 314, operation 318 represents deploying (e.g., configuring the RIS for deployment/usage) at this final deployment position, along with the radio unit, and the process ends. Note that this deployment position for the RIS may not correspond to the largest receive gain possible, but is the largest receive gain determined during the iterations until the stopping criterion is met, that is, until a selected candidate position results in a sufficient receive gain level.

Figure 5:
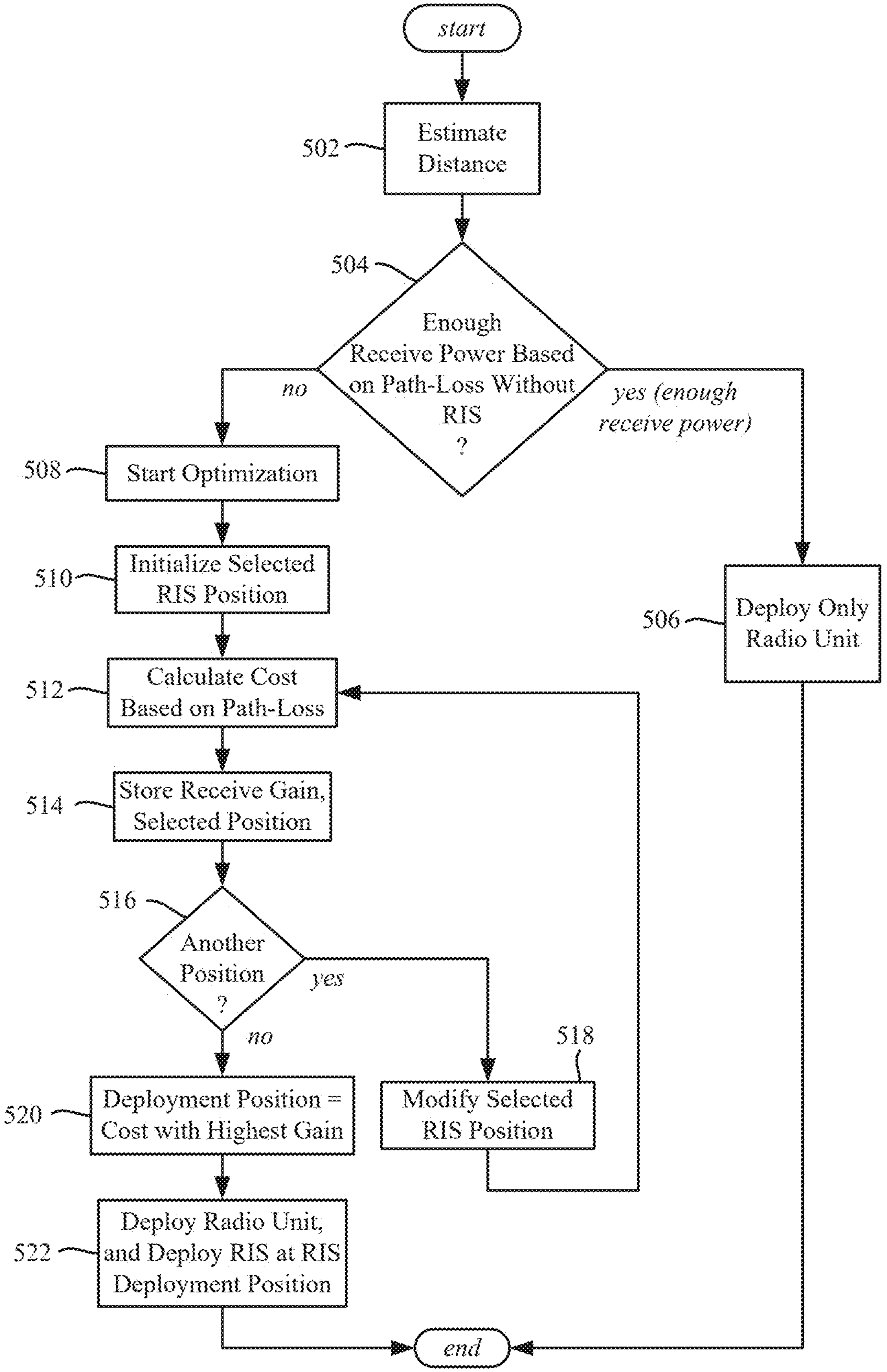
FIG. 5 is a flow diagram representing alternative example operations (relative to the operations of FIG. 3) related to reconfigurable intelligent surface placement based on utilizing path-loss estimation, in accordance with various embodiments and implementations of the subject disclosure.

FIG. 5 depicts an alternative iterative procedure (relative to FIG. 3) that operates to determine an optimal RIS position with respect to providing the highest receive gain. Thus, operation 502 similarly represents estimating the various distance data, e.g., based on the transmitter and receiver locations, and operation 504 evaluates whether there is sufficient receive power, based on a distance-based path loss determination, without deploying a RIS. If so, no RIS is needed, and the process ends after deploying only the corresponding radio unit (operation 506).

If there is insufficient receive power without the RIS, operation 504 instead branches to operation 508 to begin the cost optimization (equation (20)) until a stopping criterion is met, which in this example implementation is iterating over the full set of possible candidate positions. Operation 510 initializes a selected RIS candidate position, e.g., as far right along the horizontal axis as possible; note that vertical positioning is again not considered in this example.

Operation 512 represents calculating the path loss at the currently selected candidate position, which corresponds to the cost determination/amount of receive gain using the equations (20)-(22). This currently selected candidate position and receive gain (or cost) pairing is stored via operation 514; note that each pairing can be maintained, or only if a pairing for the current iteration has a higher receive gain than that stored for a previous iteration as the highest thus far. Operations 516 and 518 modify the candidate position, to select new candidate positions for repeating the iterative process until no candidate positions remain.

When no candidate positions remain to evaluate for path loss, the position with the highest receive gain, corresponding to the optimized cost is known. Operation 520 selects (e.g., outputs or saves) the candidate position with the highest receive gain as the final deployment position for the RIS. Operation 522 represents deploying (e.g., configuring the RIS for deployment/usage) at this deployment position, along with the radio unit, and the process ends. Note that although not shown in FIG. 5, a final check may be made to ensure that the RIS at this final determined deployment position results in sufficient receive power with respect to a threshold receive power level.

It should be noted that the operations of FIGS. 3 and 5 are based on a selected size, which, for example, can be selected in various ways. For example, an enterprise may have an existing metasurface that is to be used, in which event the "selected" size is known in advance, and only the deployment position needs to be determined, such as via the example operations of FIG. 3 or FIG. 5. Alternatively, one deployment position can be determined via the example operations of FIG. 3, with various sizes then iterated over at that deployment position until a smallest size that achieves the desired gain is determined to be the deployment size. As another alternative, a subset (possibly only one) of highest gain candidate positions can be determined via the example operations of FIG. 5, with various sizes then iterated over at the subset of deployment positions until a deployment position and deployment size that together achieve the highest gain is determined to be the deployment size.

Figure 6:
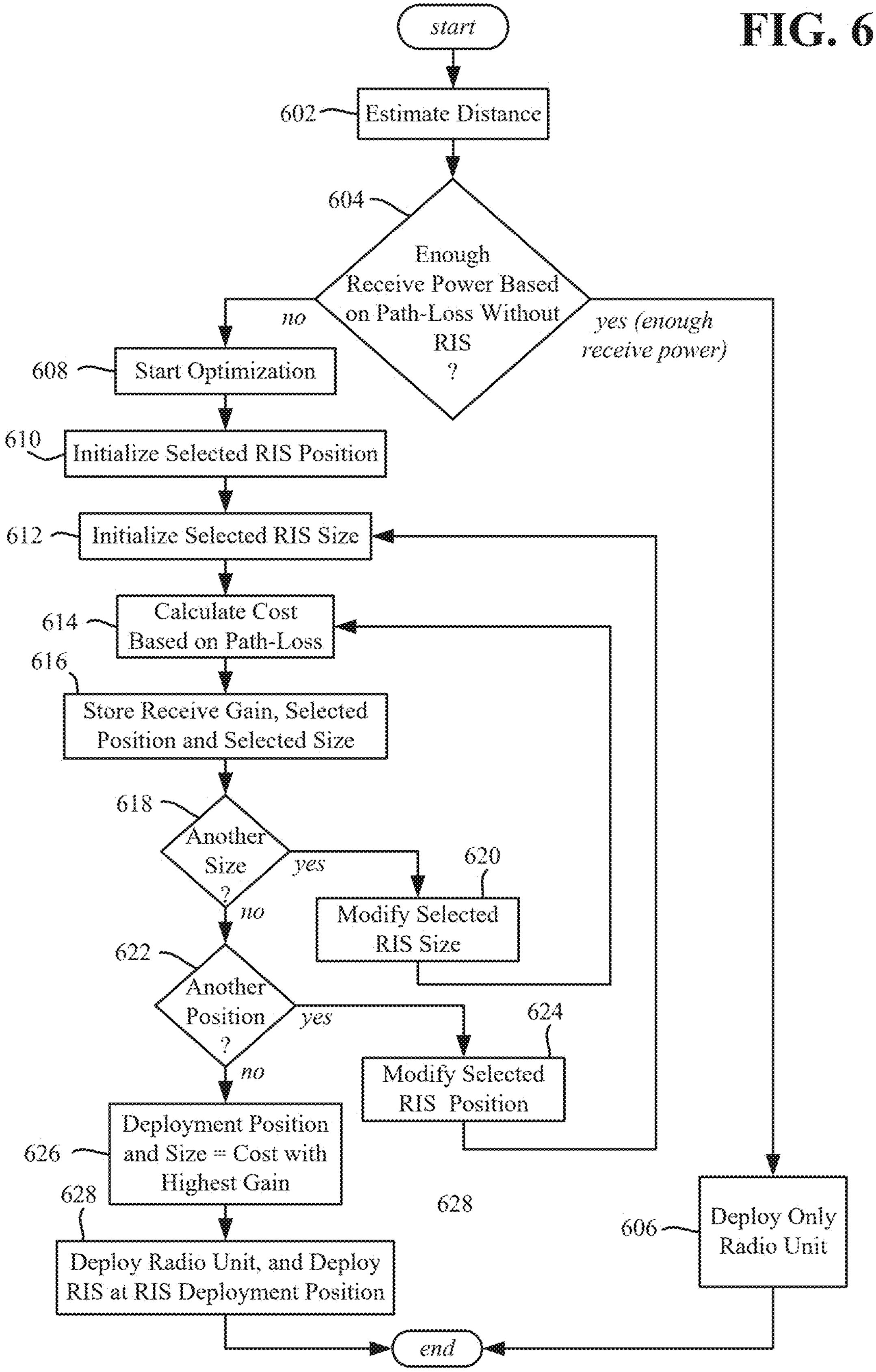
FIG. 6 is a flow diagram representing alternative example operations related to selecting reconfigurable intelligent surface placement and size based on utilizing path-loss estimation, in accordance with various embodiments and implementations of the subject disclosure.

Still further, combinations of sizes and positions can be iterated over, such as in a nested loop, as described with reference to FIG. 6. FIG. 6 thus depicts an alternative iterative procedure that operates to determine an optimal RIS deployment position and deployment size with respect to providing the highest receive gain. Thus, operation 602 similarly represents estimating the various distance data, e.g., based on the transmitter and receiver locations, and operation 604 evaluates whether there is sufficient receive power, based on a distance-based path loss determination, without deploying a RIS. If so, no RIS is needed, and the process ends after deploying only the corresponding radio unit (operation 606).

If there is insufficient receive power without the RIS, operation 604 instead branches to operation 608 to begin the cost optimization (equation (20)) until a stopping criterion is met, which in this example implementation is iterating over the full set of possible candidate positions and candidate sizes. Operation 610 initializes a selected RIS candidate position, e.g., as far right along the horizontal axis as possible; note that vertical positioning is again not considered in this example. Operation 612 initializes a selected RIS candidate size, e.g., a smallest practical surface area that will fit along the horizontal dimension over which candidate positions are iterated.

Operation 614 represents calculating the path loss at the currently selected candidate position and selected candidate size, which corresponds to the cost determination/amount of receive gain using the equations (20)-(22). This currently selected candidate position, size and receive gain (or cost) grouping is stored via operation 616; note that each grouping can be maintained, or only stored if a grouping for the current iteration has a higher receive gain than that stored for a previous iteration combination as the highest thus far. Operations 618 and 620 modify the candidate size, to select new candidate sizes for repeating the iterative process until no candidate sizes remain. For example, the smallest practical size initialized at operation can be based on the area of an 8×8 array of unit cells, with each iteration increasing by two more unit cells per dimension, e.g., a 10×10 array, a 12×12 array and so on up to some size limit, such as a 64×64 array. Alternatively, power of two iterations may be used, e.g., starting with a 4×4 array, then an 8×8 array, then a 16×16 array, and so on up to the predetermined limit.

When no candidate sizes remain to evaluate for path loss at the currently selected candidate position, operations 622 and 624 modify the selected RIS position, returning to operation 612 to reinitialize the selected RIS size to the starting size, to be evaluated with new selected candidate positions for repeating the iterative process until no candidate positions or candidate sizes remain.

When no candidate positions and sizes remain to evaluate for path loss, the position and size grouping with the highest receive gain, corresponding to the optimized cost is known. Operation 626 selects (e.g., outputs or saves) the candidate position with the highest receive gain as the final deployment position for the RIS. Operation 624 represents deploying (e.g., configuring the RIS for deployment/usage) at this deployment position, along with the radio unit, and the process ends. Note that although not shown in FIG. 6, a final check may be made to ensure that the RIS at this final determined deployment position results in sufficient receive power with respect to a threshold receive power level (or signal strength).

It should be noted that the operations of FIGS. 3, 5 and 6 are only non-limiting examples, and that many other ways to determine a deployment size and deployment position can be used with the path loss model described herein. For example, a designer/planner can fully randomize respective pairings of the input variables [position, size] and subsequently evaluate their respective costs. Although the relationship between these position and size factors is non-linear, size generally aligns with intuition, that is, a larger size tends to yield larger receive gains (lower loss), while a smaller size tends to result in smaller receive gains (higher loss).

If expense is a significant consideration, the smallest size RIS that achieves a highest receive gain (that is sufficiently high) can be selected, such as by modifying the nested loop ordering in FIG. 6 so that a selected size, starting from smallest to largest, is iterated over each position. Then, after that selected size has been evaluated over the iteratively-selected candidate positions, a stopping criterion is evaluated to determine whether the highest gain with that current size satisfies the amount of receive gain (power level) desired; if so, the position corresponding to that highest gain can be selected as the deployment position, with the size used in that iteration selected for the deployment size. Many other optimization procedures can be used, e.g., select the smallest size and corresponding position from among the top-N gains having a receive gain that is sufficient with respect to the desired amount of receive gain (e.g., the power level satisfies the power level threshold), and so on.

Figure 7:
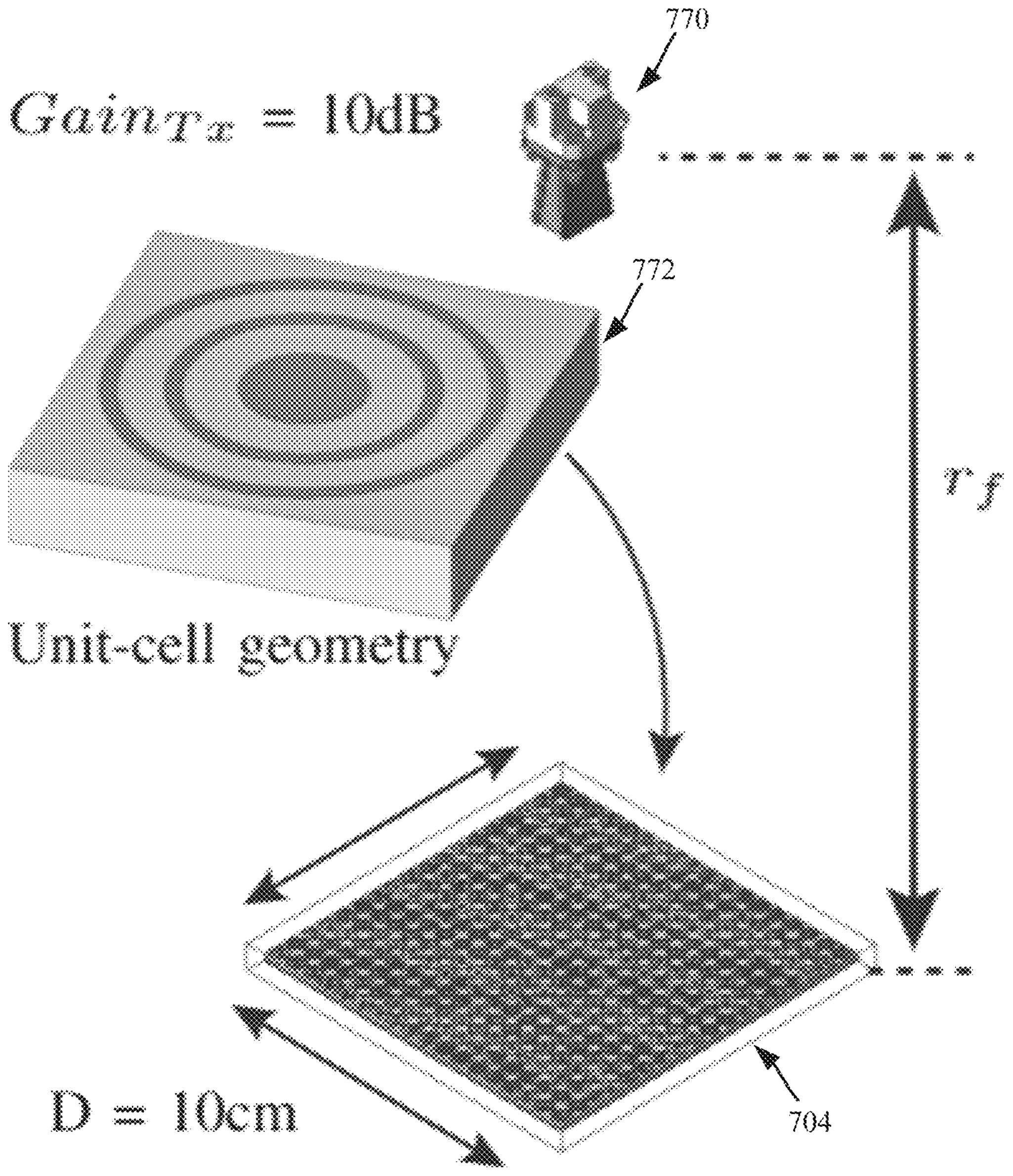
FIG. 7 is a representation of an example reconfigurable intelligent surface simulation setup for evaluation of the path loss model described herein, in accordance with various embodiments and implementations of the subject disclosure.
Figure 8:
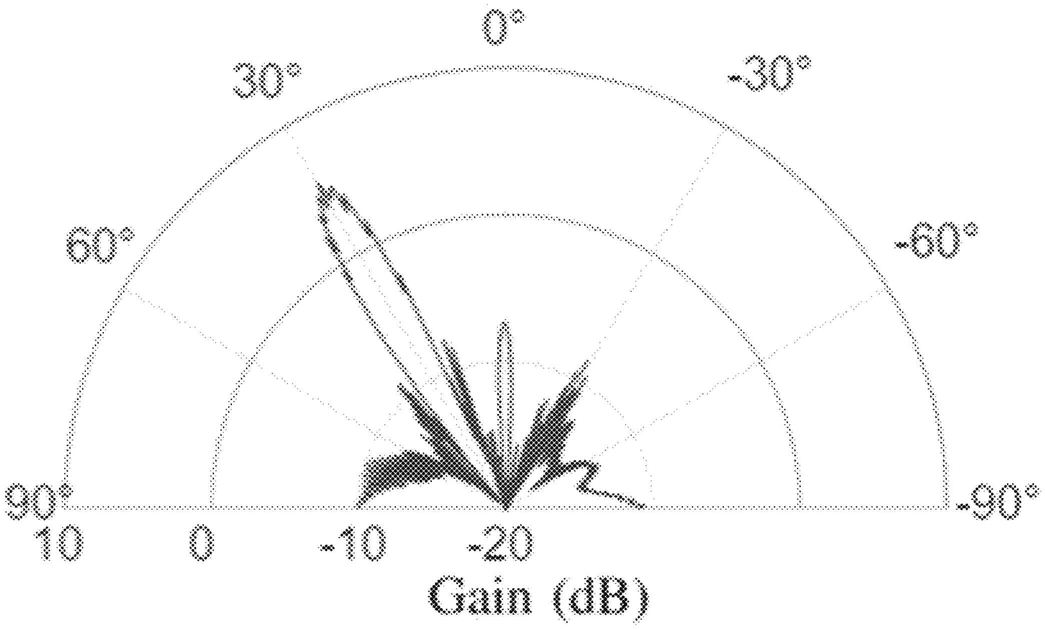
FIG. 8 is a representation of an example gain plot corresponding to the reconfigurable intelligent surface setup of FIG. 6, in accordance with various embodiments and implementations of the subject disclosure.

FIGS. 7 (experimental setup) and 8 (gain plot) are directed to examples that can be compared against numerical and experimental data to evaluate the quality of the estimation. A transmitter 770 with a $Gain_{Tx}$ of 10 dB is simulated for transmitting a signal over a distance $r_f$ to a RIS 704, e.g., having dimensions of 10 cm×10 cm. An element (unit cell) 772 of the RIS 704 is shown enlarged with a geometry on the order of 5.35 mm, to illustrate a Bull's eye aperture shape that is simulated (e.g., via an Ansys high-frequency structure simulator) to calculate far-field gain for comparison against results of the path loss model as described herein.

The following table shows a comparison of the estimated gain using different approaches:

| Approach Name | Gain dB |
|---|---|
| Path Loss Model Described Herein | 6.72 |
| Path Loss Model Described Herein with Minor Effects | 5.29 |
| Numerical | 5.54 |
| Approaches in Literature | 3.92-7.92 |

This comparison highlights limitations and the improvement of the path-loss model described herein compared to the existing literature. One limitation includes lower accuracy (~2 dB higher than the numerical/experimental result) due to exclusion of physical effects that are not easily accessible. Usually, such effects are included as a fitting/empirical parameters in the existing standard model; such a standard model will produce a range of values where the actual value is included, such as the value in the range 3.92-7.92 dB shown in the table. In contrast, the path loss model described herein uses only geometrical parameters and the Tx-Rx directivity, which are easily accessible to the designer, and which result in a single value with acceptable error.

Figure 9:
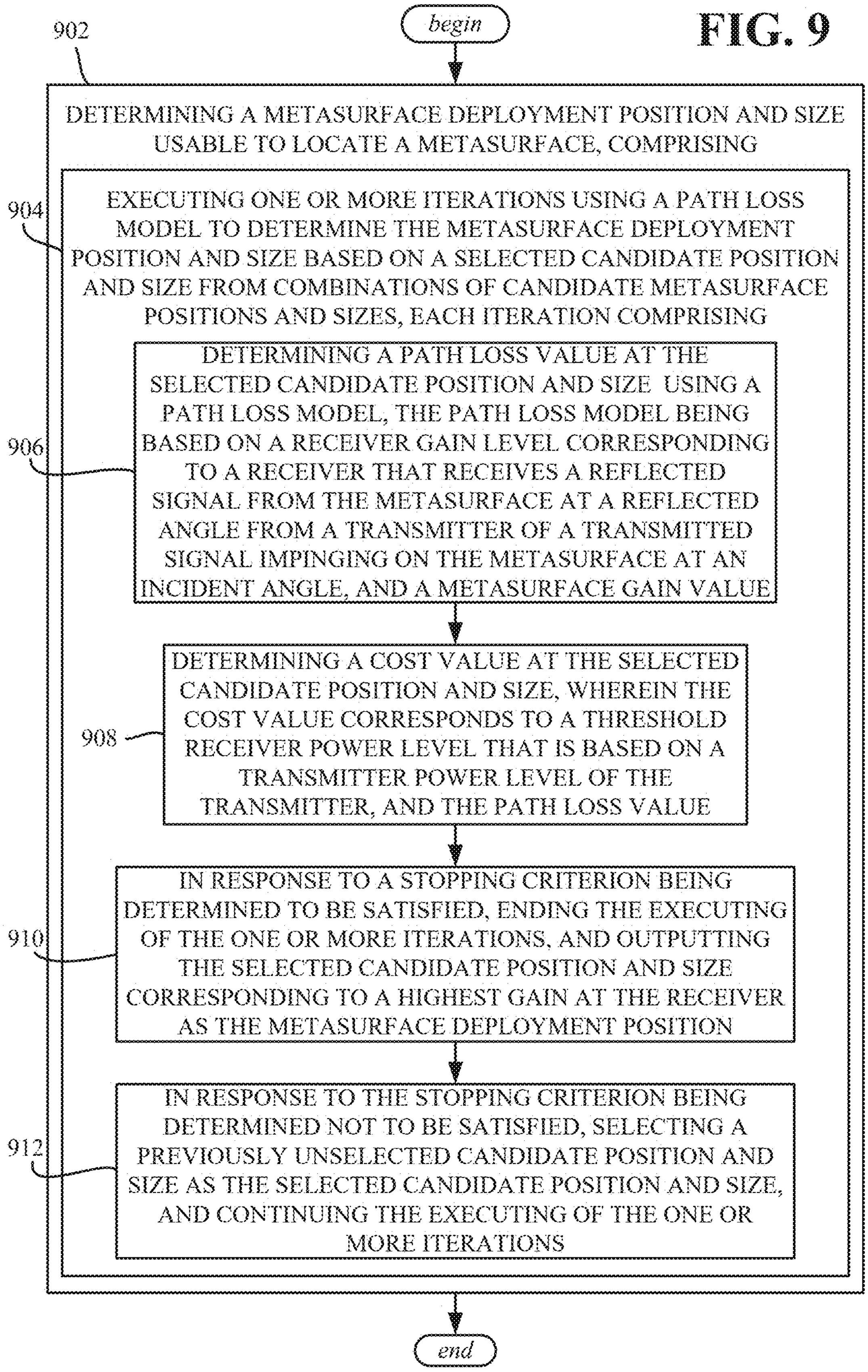
FIG. 9 is a flow diagram showing example operations related to determining a metasurface deployment position usable to locate a metasurface, in accordance with various embodiments and implementations of the subject disclosure.

One or more concepts described herein can be embodied in a system, such as represented in the example operations of FIG. 9, and for example can include a memory that stores computer executable components and/or operations, and at least one processor that executes computer executable components and/or operations stored in the memory. Example operations can include operation 902, which represents determining a metasurface deployment position and size usable to deploy a metasurface. Determining the metasurface deployment position and size can include operation 904, which can include example operation 904, which represents executing one or more iterations using a path loss model to determine the metasurface deployment position and size based on a selected candidate position and size from combinations of candidate metasurface positions and sizes; each iteration can include operations 906, 908, 910 and 912. Example operation 906 represents determining a path loss value at the selected candidate position and size using a path loss model, the path loss model being based on a receiver gain level corresponding to a receiver that receives a reflected signal from the metasurface at a reflected angle from a transmitter of a transmitted signal impinging on the metasurface at an incident angle, and a metasurface gain value. Example operation 908 represents determining a cost value at the selected candidate position and size, wherein the cost value corresponds to a threshold receiver power level that is based on a transmitter power level of the transmitter, and the path loss value. Example operation 910 represents, in response to a stopping criterion being determined to be satisfied, ending the executing of the one or more iterations, and outputting the selected candidate position and size corresponding to a highest gain at the receiver as the metasurface deployment position. Example operation 912 represents, in response to the stopping criterion being determined not to be satisfied, selecting a previously unselected candidate position and size as the selected candidate position and size, and continuing the executing of the one or more iterations.

The stopping criterion can correspond to the threshold receiver power level being satisfied.

Further operations can include, storing, for respective iterations, one or more respective selected candidate positions and sizes associated with respective cost values determined in the respective iterations; the stopping criterion can correspond to having no remaining unselected candidate positions and sizes, and the outputting of the selected candidate position and size corresponding to the highest gain at the receiver can include determining, as the metasurface deployment position, a respective candidate position and size from the respective selected candidate positions and a selected one or more sizes that are associated with a respective cost value of the respective cost values that corresponds to the highest gain at the receiver.

The cost value can equal the threshold power level minus the transmitter power level minus the path loss value at the selected candidate position.

The group of candidate metasurface positions include locations along one dimension.

The path loss value can be further based on a free space path loss level, and the metasurface gain value can be based on a wavelength of the transmitted signal, a spillover efficiency ratio, and an effective area of the metasurface determined from a physical aperture area of the metasurface, the incident angle, and the reflected angle. The spillover efficiency ratio can be dependent on antenna reflectivity data, metasurface size data, and distance data corresponding to a distance between the metasurface and the transmitter.

The metasurface gain value can be further based on an illumination efficiency ratio.

The metasurface gain value can be a function of the effective area, the wavelength, the spillover efficiency ratio, and the illumination efficiency ratio. The illumination efficiency can be nearly equal to one, and can be approximated to be equal to one.

The threshold path loss value can correspond to a selected reference signal received power level.

The selected received power level can correspond to a reference signal received power level.

The threshold path loss value can correspond to a signal strength value.

The signal strength value can correspond to a received signal strength indicator.

Figure 10:
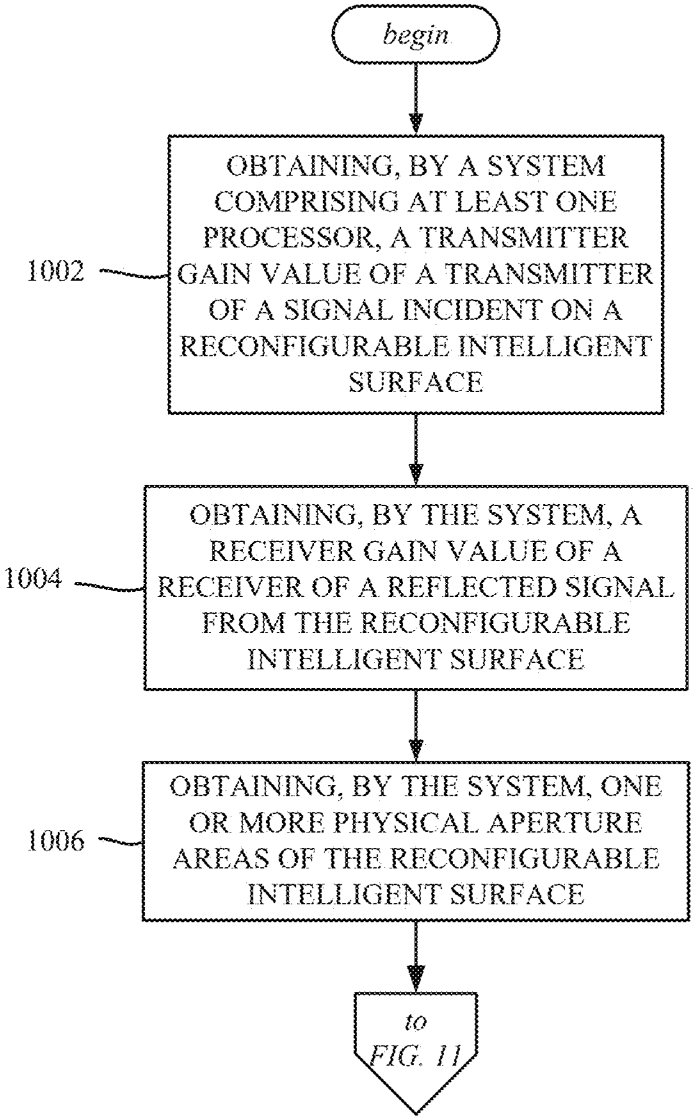
FIGS. 10 and 11 comprise a flow diagram showing example operations related to configuring a reconfigurable intelligent surface for usage based on locating the reconfigurable intelligent surface at a deployment position determined via path loss values, in accordance with various embodiments and implementations of the subject disclosure.
Figure 11:
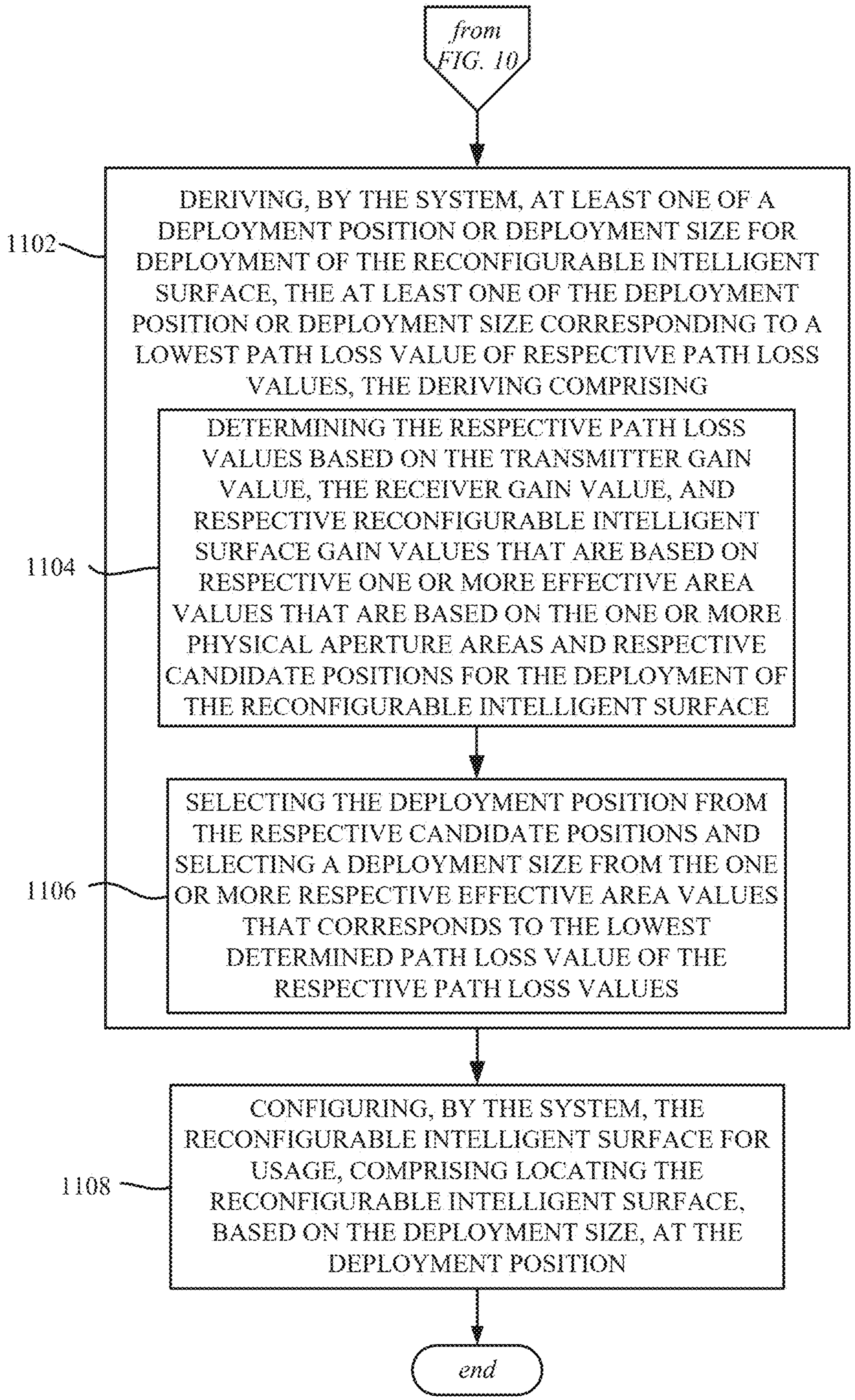

One or more example implementations and embodiments, such as corresponding to example operations of a method, are represented in FIGS. 10 and 11. Example operation 1002 of FIG. 10 represents obtaining, by a system comprising at least one processor, a transmitter gain value of a transmitter of a signal incident on a reconfigurable intelligent surface. Example operation 1004 represents obtaining, by the system, a receiver gain value of a receiver of a reflected signal from the reconfigurable intelligent surface. Example operation 1006 represents obtaining, by the system, one or more physical aperture areas of the reconfigurable intelligent surface. The operations continue at FIG. 11, where example operation 1102 represents deriving, by the system, at least one of a deployment position or deployment size for deployment of the reconfigurable intelligent surface, the at least one of the deployment position or deployment size corresponding to a lowest path loss value of respective path loss values, the deriving can include operations 1104 and 1106. Example operation 1104 represents determining the respective path loss values based on the transmitter gain value, the receiver gain value, and respective reconfigurable intelligent surface gain values that are based on respective one or more effective area values that are based on the one or more physical aperture areas and respective candidate positions for the deployment of the reconfigurable intelligent surface. Example operation 1102 represents selecting the deployment position from the respective candidate positions and selecting a deployment size from the one or more respective effective area values that corresponds to the lowest determined path loss value of the respective path loss values. Example operation 1108 represents configuring, by the system, the reconfigurable intelligent surface for usage, comprising locating the reconfigurable intelligent surface, based on the deployment size, at the deployment position.

Selecting the deployment position can occur in response to a respective gain value, corresponding to a respective path loss value of the respective path loss values, being determined to satisfy a threshold gain value at the receiver.

Obtaining the respective effective area values can include determining respective incident angles corresponding to the signal incident on the reconfigurable intelligent surface at the respective candidate positions, and respective reflected angles corresponding to the reflected signal from the reconfigurable intelligent surface at the respective candidate positions.

The respective reconfigurable intelligent surface gain values can be further based on a spillover efficiency ratio.

Figure 12:
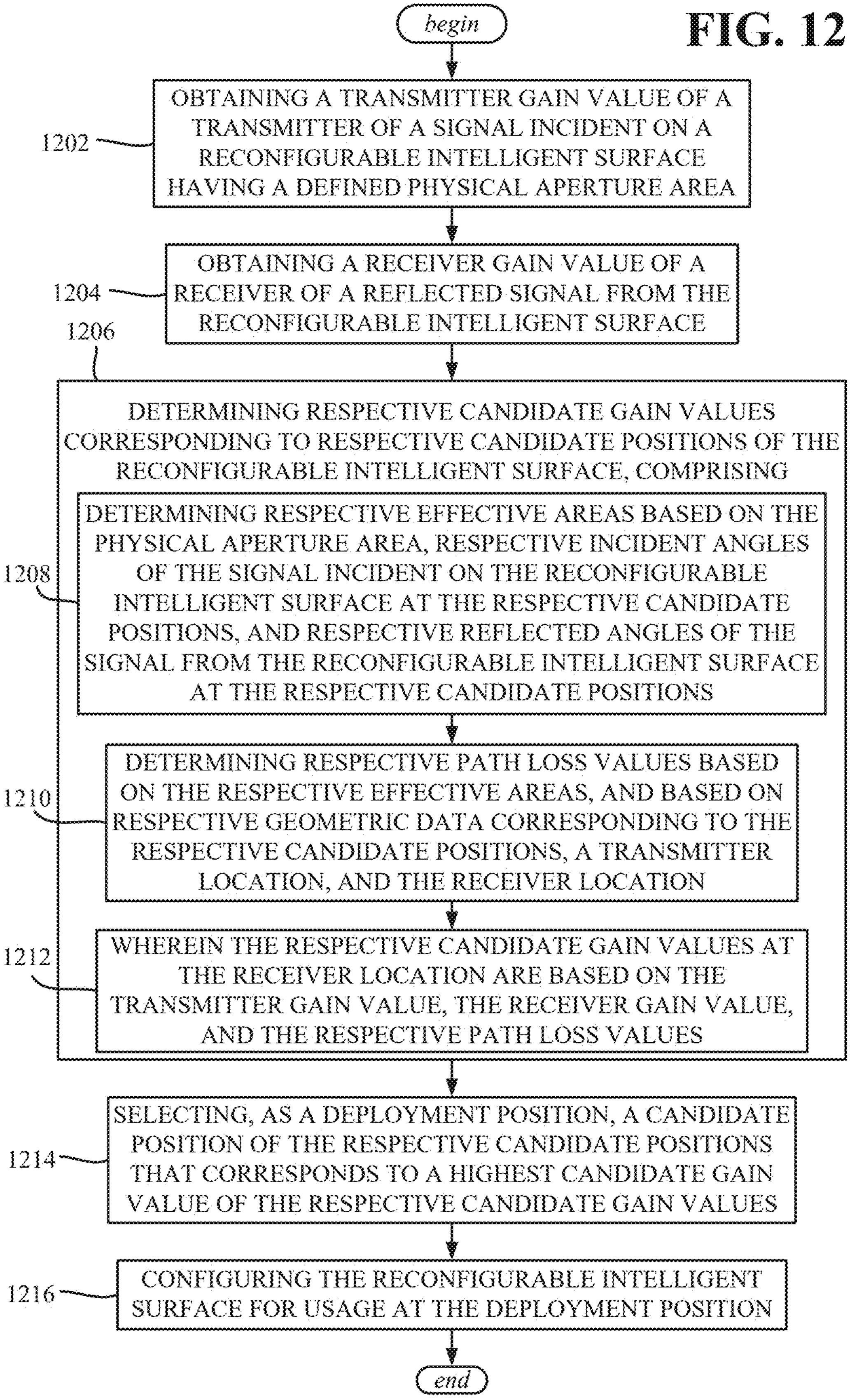
FIG. 12 is a flow diagram showing example operations related to selecting a deployment position for a reconfigurable intelligent surface based on path loss determinations corresponding to a highest gain value, in accordance with various embodiments and implementations of the subject disclosure.

FIG. 12 summarizes various example operations, e.g., corresponding to a machine-readable medium, comprising executable instructions that, when executed by a processor, facilitate performance of operations. Example operation 1202 represents obtaining a transmitter gain value of a transmitter of a signal incident on a reconfigurable intelligent surface having a defined physical aperture area. Example operation 1204 represents obtaining a receiver gain value of a receiver of a reflected signal from the reconfigurable intelligent surface. Example operation 1206 represents determining respective candidate gain values corresponding to respective candidate positions of the reconfigurable intelligent surface, which can include example operations 1208, 1210 and 1212. Example operation 1208 represents determining respective effective areas based on the physical aperture area, respective incident angles of the signal incident on the reconfigurable intelligent surface at the respective candidate positions, and respective reflected angles of the signal from the reconfigurable intelligent surface at the respective candidate positions. Example operation 1210 represents determining respective path loss values based on the respective effective areas, and based on respective geometric data corresponding to the respective candidate positions, a transmitter location, and the receiver location. Example operation 1212 represents that the respective candidate gain values at the receiver location can be based on the transmitter gain value, the receiver gain value, and the respective path loss values. Example operation 1214 represents selecting, as a deployment position, a candidate position of the respective candidate positions that corresponds to a highest candidate gain value of the respective candidate gain values. Example operation 1216 represents configuring the reconfigurable intelligent surface for usage at the deployment position.

The respective candidate gain values can correspond to respective cost data, and determining the respective candidate gain values can include iteratively selecting different respective instances of the respective candidate positions to determine which respective instance of the respective instances optimizes the cost data.

As can be seen, the technology described herein facilitates designing and implementing a reconfigurable intelligent surface based on a straightforward path-loss model, with simplified input variables and the mitigation of characterization complexity. Also described herein are optimization approaches with a defined optimization cost expression. The technology described herein overcomes the many drawbacks of existing standard approaches, including highly-complex path-loss modeling and extensive numerical methods, e.g., that include many physical effects such as phase error, spectrum reflection, and average unit cell loss, which are challenging to evaluate. As such, the existing approaches use physical effect parameters as fitting parameters to make the 'estimation' closer to the numerical or experimental gain, because the estimation provides a range instead of a single value, where the actual gain is included in such range.

Using the technology described herein, a design process based on the path loss is able to achieve an optimization goal, e.g., defined based on the path loss model and received power. Numerical experiments using an industry standard full-wave 3D electromagnetic modeler validate the model described herein. The accurate path-loss modeling technology described herein thus overcomes the drawbacks of traditional path-loss modeling that deals with the intricacies of empirical parameters for curve fitting, including unit cell pattern characterization, spectrum reflection loss/gain, phase error losses, and more, which do not well suit real-world RIS implementations.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and a memory that stores executable instructions that, when executed by the at least one processor, facilitate performance of operations, the operations comprising:

determining a metasurface deployment position and size usable to deploy a metasurface, comprising:

executing one or more iterations using a path loss model to determine the metasurface deployment position and size based on a selected candidate position and size from combinations of candidate metasurface positions and sizes, each iteration comprising:

determining a path loss value at the selected candidate position and size using a path loss model, the path loss model being based on a receiver gain level corresponding to a receiver that receives a reflected signal from the metasurface at a reflected angle from a transmitter of a transmitted signal impinging on the metasurface at an incident angle, and a metasurface gain value;

determining a cost value at the selected candidate position and size, wherein the cost value corresponds to a threshold receiver power level that is based on a transmitter power level of the transmitter, and the path loss value;

in response to a stopping criterion being determined to be satisfied, ending the executing of the one or more iterations, and outputting the selected candidate position and size corresponding to a highest gain at the receiver as the metasurface deployment position; and in response to the stopping criterion being determined not to be satisfied, selecting a previously unselected candidate position and size as the selected candidate position and size, and continuing the executing of the one or more iterations.

2. The system of claim 1, wherein the stopping criterion corresponds to the threshold receiver power level being satisfied.

3. The system of claim 1, wherein the operations further comprise, storing, for respective iterations, one or more respective selected candidate positions and sizes associated with respective cost values determined in the respective iterations, wherein the stopping criterion corresponds to having no remaining unselected candidate positions and sizes, and wherein the outputting of the selected candidate position and size corresponding to the highest gain at the receiver comprises determining, as the metasurface deployment position, a respective candidate position and size from the respective selected candidate positions and one or more sizes that is associated with a respective cost value of the respective cost values that corresponds to the highest gain at the receiver.

4. The system of claim 1, wherein the cost value equals the threshold power level minus the transmitter power level minus the path loss value at the selected candidate position.

5. The system of claim 1, wherein the group of candidate metasurface positions comprises locations along one dimension.

6. The system of claim 1, wherein the path loss value is further based on a free space path loss level, and wherein the metasurface gain value is based on a wavelength of the transmitted signal, a spillover efficiency ratio, and an effective area of the metasurface determined from a physical aperture area of the metasurface, the incident angle, and the reflected angle.

7. The system of claim 6, wherein the spillover efficiency ratio is dependent on antenna reflectivity data, metasurface size data, and distance data corresponding to a distance between the metasurface and the transmitter.

8. The system of claim 1, wherein the metasurface gain value is further based on an illumination efficiency ratio.

9. The system of claim 1, wherein the metasurface gain value is a function of the effective area, the wavelength, the spillover efficiency ratio, and the illumination efficiency ratio.

10. The system of claim 9, wherein the illumination efficiency is nearly equal to one, and is approximated to be equal to one.

11. The system of claim 1, wherein the threshold path loss value corresponds to a selected reference signal received power level.

12. The system of claim 11, wherein the selected received power level corresponds to a reference signal received power level.

13. The system of claim 1, wherein the threshold path loss value corresponds to a signal strength value.

14. The system of claim 13, wherein the signal strength value corresponds to a received signal strength indicator.

* * * * *